(12) United States Patent
Sakuragi

(10) Patent No.: US 7,030,922 B2
(45) Date of Patent: Apr. 18, 2006

(54) IMAGE PICKUP APPARATUS WHICH REDUCES NOISE GENERATED IN AN AMPLIFIER TRANSISTOR

(75) Inventor: Takamasa Sakuragi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 675 days.

(21) Appl. No.: 10/194,281

(22) Filed: Jul. 15, 2002

(65) Prior Publication Data

US 2003/0025816 A1 Feb. 6, 2003

(30) Foreign Application Priority Data

Jul. 17, 2001 (JP) .............................. 2001-217121

(51) Int. Cl.
*H04N 3/14* (2006.01)
*H04N 3/335* (2006.01)

(52) U.S. Cl. ................................... 348/308; 250/208.1

(58) Field of Classification Search ................ 348/301, 348/308; 250/208.1
See application file for complete search history.

(56) References Cited

U.S. PATENT DOCUMENTS

| | | | |
|---|---|---|---|
| 5,488,415 A * | 1/1996 | Uno ............................ 348/241 |
| 5,923,369 A * | 7/1999 | Merrill et al. ............... 348/301 |
| 6,046,444 A * | 4/2000 | Afghahi ..................... 250/208.1 |
| 6,049,357 A * | 4/2000 | Shinohara ................... 348/307 |
| 6,300,978 B1 * | 10/2001 | Matsunaga et al. ......... 348/308 |
| 6,344,877 B1 * | 2/2002 | Gowda et al. ............... 348/245 |
| 2004/0080644 A1 * | 4/2004 | Suzuki et al. ................ 348/301 |

FOREIGN PATENT DOCUMENTS

EP 0 952 730 A2 10/1999
JP 2000-4399 1/2000

OTHER PUBLICATIONS

Bloom et al.; "1 / $f$ Noise Reduction of Metal-Oxide-Semiconductor Transistors by Cycling from Inversion to Accumulation," 58 (15) Appl. Phys. Lett. 1664-1666 (1991).
Klumperink et al.; "Reducing MOSFET 1/f Noise and Power Consumption," 35 (7) IEEE Journal of Solid-State Circuits 994-1001 (2000).

\* cited by examiner

*Primary Examiner*—Ngoc-Yen Yu
*Assistant Examiner*—James M. Hannett
(74) *Attorney, Agent, or Firm*—Fitzpatrick, Cella, Harper & Scinto

(57) ABSTRACT

An image pickup apparatus includes a plurality of sensor cells each including a photoelectric conversion element, an amplifier transistor which amplifies and outputs a signal from the photoelectric conversion element, and a selector transistor for selectively outputting a signal from the amplifier transistor, and a driving circuit which supplies a predetermined voltage to the transistor so as to change the amplifier transistor to an OFF state or an accumulation state before the amplifier transistor outputs a signal generated in the photoelectric conversion element.

6 Claims, 18 Drawing Sheets

IMAGE PICKUP APPARATUS WHICH REDUCES NOISE GENERATED IN AN AMPLIFIER TRANSISTOR

BACKGROUND OF THE INVENTION

1. Field of the Invention

The present invention relates to an image pickup apparatus for reducing 1/f noise generated in a transistor.

2. Related Background Art

FIG. 1 shows the circuit arrangement of a conventional MOS sensor cell contained in an image pickup apparatus. The MOS sensor cell is formed from a photodiode 201, amplifier MOS transistor 202, selector transistor 203, and reset transistor 204. Signal charges generated in the photodiode 201 in accordance with incident light are converted into a voltage by a parasitic capacitance in the gate terminal of the amplifier MOS transistor 202. A HIGH-level signal is applied to the gate terminal of the selector transistor 203, and then the selector transistor 203 is turned on. The gate signal voltage of the amplifier transistor 202 is output from the source terminal of the amplifier transistor 202 which has a source follower circuit arrangement.

When this sensor cell is not selected, a LOW voltage is supplied to the gate terminal of the selector transistor 203 to keep the selector transistor 203 off. The source voltage of the amplifier transistor 202 charges the parasitic capacitance in the source terminal to gradually increase the source voltage.

FIG. 2 shows an example of a conventional image pickup apparatus where a plurality of sensor cells described above are two-dimensionally arrayed. The image pickup apparatus comprises sensor cells 301, horizontal transfer switches 302, and a horizontal shift register 303 which sequentially turns on the horizontal transfer switches 302, a vertical shift register 304 which selects and activates a sensor cell, an output amplifier 305, an output terminal 306, and noise elimination circuits 310.

The sensor cell 301 has the same arrangement as that in FIG. 1. In many cases, the outputs of photoelectric conversion elements on each column are connected to a vertical signal line 308, and an impedance conversion MOS source follower 309 is inserted in the vertical signal line 308. In general, the source follower 309 is not turned on/off and continuously operates while the power supply is ON.

The output of the impedance conversion MOS source follower 309 is generally connected to the noise elimination circuit 310 for eliminating noises generated by manufacturing variations in the sensor cell 301 and MOS source follower circuit 309.

FIG. 3 shows the circuit arrangement of another conventional MOS photoelectric conversion element. The photoelectric conversion element comprises a photodiode 1, an amplifier MOS transistor 2, a selector transistor 3, a reset transistor 4, a constant current source 5 which supplies a bias current to the amplifier transistor 2, and a transfer switch 6 which transfers charges from the photodiode 1 to the input of the amplifier transistor 2. Signal charges generated in the photodiode 1 in accordance with incident light are converted into a voltage by a parasitic capacitance in the gate terminal of the amplifier MOS transistor 2. A HIGH-level signal is applied to the gate terminal of the selector transistor 3, and then the selector transistor 3 is turned on. The gate signal voltage of the amplifier transistor 2 is output from the source terminal of the amplifier transistor 2 which has a source follower circuit arrangement.

When this sensor cell is not selected, a LOW voltage is supplied to the gate terminal of the selector transistor 3 to keep the selector transistor 3 off. The source voltage of the amplifier transistor 2 charges the parasitic capacitance in the source terminal to gradually increase the source voltage.

FIG. 4 shows an example of a conventional photoelectric conversion apparatus where a plurality of sensor cells described above are two-dimensionally arrayed. The photoelectric conversion apparatus comprises sensor cells 100, sensor cell selection signal lines 101, sensor reset signal lines 102, sensor signal transfer signal lines 103, horizontal transfer switches 16, a horizontal transfer shift register 14 which sequentially turns on the horizontal transfer switches 16, a vertical shift register 15 which drives the signal lines 101, reset signal lines 102, and transfer signal lines 103 for selecting and activating sensor cells, an output amplifier 17, an output terminal 18, and noise elimination circuits 10.

The sensor cell 100 has the same arrangement as that in FIG. 3. The outputs of sensor cells on each column are connected to a vertical signal line 8, and the vertical signal line is generally connected to the noise elimination circuit 10 for eliminating noise generated by manufacturing variations in a sensor cell.

The operation of the conventional image pickup apparatus will be briefly described with reference to the timing chart of FIG. 5. Assume that the noise elimination circuit 10 obtains some differential output by using an output when the sensor is reset, and a signal output corresponding to an optical output.

Sensor cells on the first row are selected by a pulse 12201 applied to a signal line 101-1, the reset transistor 4 is turned on by a pulse 12202 applied to a reset signal line 102-1, and a corresponding output (Vres) is output to the vertical signal line 8. Subsequently, a transfer switch 6 is turned on by a pulse 12203 applied to a transfer signal line 103-1, and a signal (Vsig) corresponding to an optical signal input to the sensor is output to the vertical signal line 8. The noise elimination circuit 10 performs subtraction of the two signals Vres and Vsig to eliminate noise generated in the sensor cell. The noise-eliminated signal is sequentially activated by pulses 12204 to 12206 for driving the horizontal transfer switch 16. Sensor output signals on the first row are sequentially obtained by the output amplifier 17 via a horizontal signal line 19.

The gate widths and lengths of the amplifier transistor 2 and selector transistor 3 in FIG. 3 are set to very small in order to downsize the photoelectric conversion element. In particularly, needs for high-density image pickup elements have recently grown. The amplifier transistor which constitutes a sensor cell is often set to a minimum size enough to be achieved by the manufacturing process.

A noise power density $Vn^2$ of 1/f noise in a MOS transistor is generally given by $$Vn^2 = K/(W \times L \times Cox \times f)$$

where K: constant of proportionality
  W: gate width of MOS transistor
  L: gate length of MOS transistor
  Cox: capacitance per unit area
  f: frequency As is apparent from this equation, 1/f noise is inversely proportional to the product of the gate length L and gate width W of the MOS transistor. Hence, 1/f noise increases in the amplifier transistor 2 whose gate area is set small. As described above, an output from the amplifier transistor 2 passes through the noise elimination circuit which suppresses mainly noise of a DC component such as the threshold voltage of the amplifier transistor by performing sampling and subtraction for noise reduction. Upon sampling, aliasing of 1/f noise occurs at the sampling frequency and its harmonics, undesirably increasing noise in a wider band. In general, an output from the noise elimination circuit is amplified until the output is output from a final output terminal. Considering a transfer function viewed from the final output or the need for downsizing the amplifier transistor 2 in order to downsize the sensor cell, the noise contribution of the amplifier transistor 2 inevitably becomes larger than another MOS transistor serving as a 1/f noise source. When the MOS transistor is used as a switch, the drain-source voltage becomes almost 0 in an ON state, the drain current becomes almost 0 in an OFF state, and thus 1/f noise can be ignored.

As described above, it is important to reduce 1/f noise in the amplifier transistor 2 within the sensor cell 100 in order to reduce 1/f noise at a final output terminal.

As a method of reducing 1/f noise in a MOS transistor, "1/f noise reduction of metal-oxide-semiconductor transistors by cycling from inversion to accumulation" is described in Applied Physics Letters Apr. 15, 1991 p. 1664–p. 1667.

According to this method, 1/f noise itself is reduced by switching a MOS transistor between two, ON and OFF states. FIG. 6 shows a 1/f noise measurement example for a duty cycle of 50% (IEEE Journal of Solid-State Circuits, vol. 35, No 7, JULY 2000, "Reducing MOSFET 1/f Noise and Power Consumption by Switched Biasing"). The result "0 V" means that the gate voltage before the OFF state is 0 V. The 1/f noise spectrum is lower by 8 db than a modulation theory value.

This result is applied to a conventional image pickup apparatus. The OFF time of the amplifier transistor in the sensor cell changes an output from the photoelectric conversion element into an intermittent waveform, failing to obtain a normal output.

If a switch for changing the amplifier transistor to an accumulation state is arranged in each sensor cell, the sensor cell size becomes larger. The switch requires a driving line for driving the switch, further increasing the size. In gate reset operation of the amplifier transistor 2 in the circuit arrangement and operation of the conventional sensor cell as shown in FIG. 3, the source of the amplifier transistor 2 is connected to only a bias current source and capacitance. Thus, while the amplifier transistor 2 is selected, it maintains the ON state. If the gate terminal of the amplifier transistor 2 is reset while the amplifier transistor 2 remains unselected, the voltage of the source terminal changes following the gate terminal voltage and charges the parasitic capacitance in the source terminal. The source voltage gradually rises, and the amplifier transistor 2 gradually comes to a sub-threshold state. However, the amplifier transistor 2 does not reach the OFF state or accumulation state, and 1/f noise in the amplifier transistor 2 cannot be suppressed in the prior art.

As another prior art of performing reset operation, there is proposed reset of a vertical signal line as shown in FIG. 7 (e.g., Japanese Laid-Open Patent Application No. 2000-4399). In FIG. 7, a reset switch M8 resets a vertical signal line. Reset by the switch M8 is performed at a timing different from the timings of reset within sensor cells S11 to Smn. Since selector switches are not simultaneously turned on while reset operation within the sensor cell and reset of the vertical signal line are performed, the reset voltage of a vertical signal line V1 is not applied to the source terminals of the amplifier transistors 2 in the sensor cells S11 to Smn. At this time, even if the reset voltage is applied to the source terminal of the amplifier transistor 2, the gate terminal of the amplifier transistor 2 has only a small parasitic capacitance. A change in source voltage is, therefore, transferred to the gate voltage by the feedback effect of the parasitic capacitance between the gate and source of the amplifier transistor 2. As a result, the gate-source voltage hardly changes, and the amplifier transistor 2 does not shift to the OFF state or accumulation state.

SUMMARY OF THE INVENTION

It is an object of the present invention to provide an image pickup apparatus which reduces 1/f noise generated in an amplifier transistor.

To achieve the above object, according to an aspect of the present invention, there is provided an image pickup apparatus comprising a plurality of sensor cells each including a photoelectric conversion element, an amplifier transistor which amplifies and outputs a signal from the photoelectric conversion element, and a selector transistor for selectively outputting a signal from the amplifier transistor, and a driving circuit which supplies a predetermined voltage to the transistor so as to change the amplifier transistor to an OFF state or an accumulation state before the amplifier transistor outputs a signal generated in the photoelectric conversion element.

According to another aspect of the present invention, there is provided an image pickup apparatus comprising a plurality of sensor cells each including a photoelectric conversion element, an amplifier transistor which amplifies and outputs a signal from the photoelectric conversion element, a selector transistor for selectively outputting a signal from the amplifier transistor, and a reset transistor which supplies a predetermined voltage to a control electrode region of the amplifier transistor and includes one main electrode region connected to the control electrode region of the amplifier transistor and the other main electrode region connected to a signal line, and a driving circuit which has a mode in which a first voltage is supplied to the signal line to turn on the reset transistor before the amplifier transistor outputs a signal generated in the photoelectric conversion element, and a mode in which a second voltage different from the first voltage is supplied to the signal line to turn on the reset transistor.

According to still another aspect of the present invention, there is provided an image pickup apparatus comprising a plurality of sensor cells each including a photoelectric conversion element, and an amplifier transistor which amplifies and outputs a signal from the photoelectric conversion element, a switching transistor which supplies a predetermined voltage to a main electrode region of the amplifier transistor, a sample/hold circuit which samples and holds a signal from the sensor cell, and a driving circuit which drives the switching transistor so as to turn on the switching transistor when the sample/hold circuit is in a hold state.

According to still another aspect of the present invention, there is provided an image pickup apparatus comprising a plurality of sensor cells each including a photoelectric conversion element, and an amplifier transistor which amplifies and outputs a signal from the photoelectric conversion element, an impedance conversion transistor which receives at a control electrode region a signal from the sensor cell and outputs the signal from a main electrode region, a sample/hold circuit which samples and holds a signal from the impedance conversion transistor, a switching transistor which supplies a predetermined voltage to the main electrode region of the impedance conversion transistor, and a driving circuit which drives the switching transistor so as to turn on the switching transistor when the sample/hold circuit is in a hold state.

According to another aspect of the present invention, there is provided an image pickup apparatus comprising a plurality of sensor cells each including a photoelectric conversion element, and an amplifier transistor which amplifies and outputs a signal from the photoelectric conversion element, an impedance conversion transistor which receives at a control electrode region a signal from the sensor cell and outputs the signal from a main electrode region, a sample/hold circuit which samples and holds a signal from the impedance conversion transistor, a switching transistor which connects the control electrode region and main electrode region of the impedance conversion transistor, and a driving circuit which drives the switching transistor so as to turn on the switching transistor when the sample/hold circuit is in a hold state.

DESCRIPTION OF THE PREFERRED EMBODIMENTS

A first switch for temporarily fixing the voltage of a vertical signal line to a given voltage is arranged on the vertical signal line of a conventional image pickup apparatus. The source terminal of an amplifier transistor is driven via the first switch such that the voltage is set high in case of that the amplifier transistor in the sensor cell is an NMOS transistor and used as a source follower, and low in case of that the amplifier transistor in the sensor cell is a PMOS transistor and used as a source follower. Like the prior art, the source terminal of the amplifier transistor in the sensor cell is generally connected to the vertical signal line via a selection switch. The source of the amplifier transistor in each sensor cell is driven at a given value by turning on the selection switch of the sensor cell while the vertical signal line is driven to the given voltage via the first switch.

At this time, the gate voltage of the amplifier transistor is reset by turning on a reset switch. The gate voltage in reset is so adjusted as to completely turn off the amplifier transistor (low voltage for an NMOS amplifier transistor and high voltage for a PMOS amplifier transistor). The amplifier transistor changes to a deep accumulation state, and the 1/f noise reduction effect can be enhanced.

If the amplifier transistor in the sensor cell is of current output type (source grounded) and the amplifier transistor is a PMOS, the gate voltage of the amplifier transistor is driven to be the source voltage or higher. If the amplifier transistor is an NMOS, the gate voltage is driven to be the source voltage or lower. This setting yields the same 1/f noise reduction effect.

Figure 8:
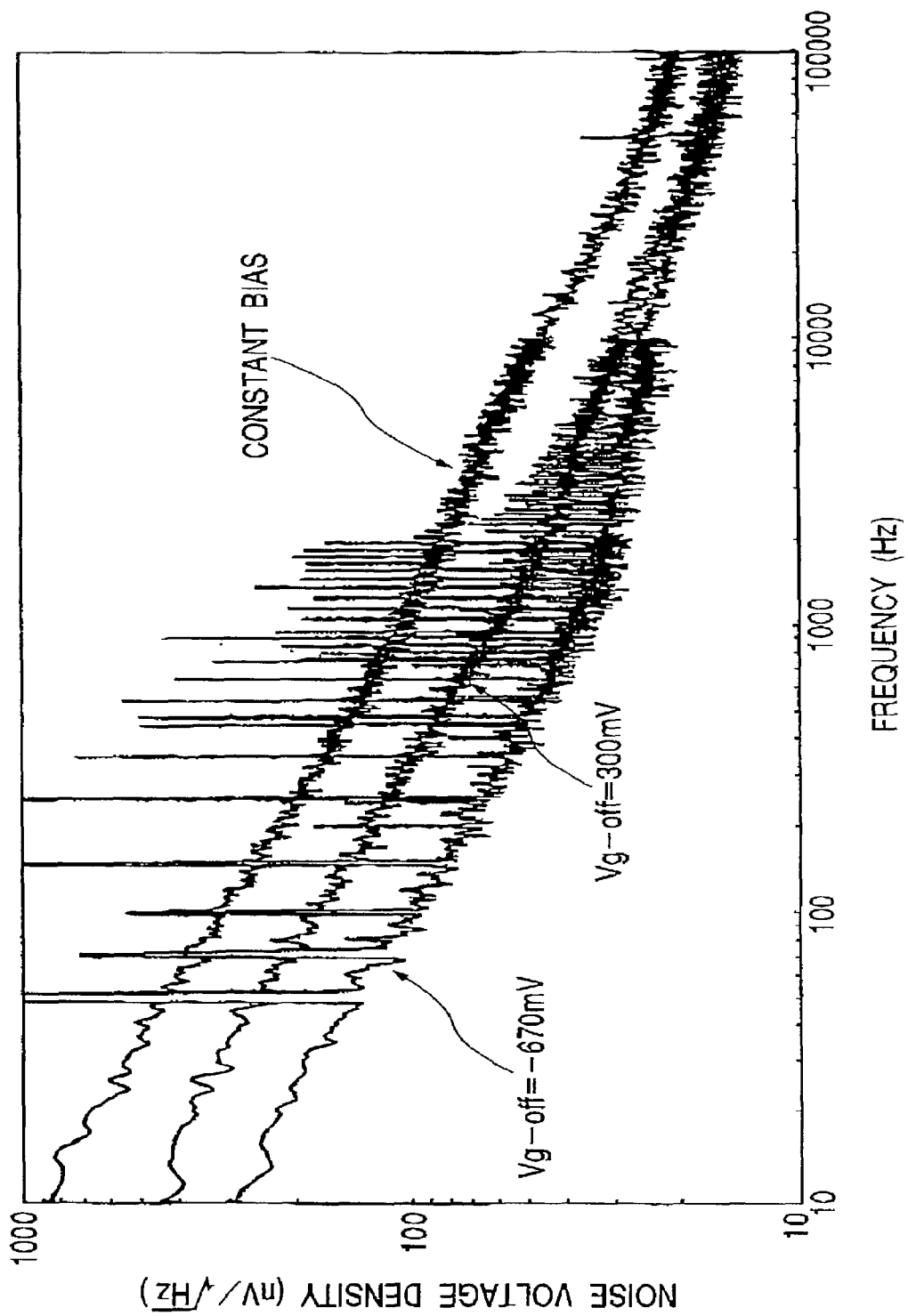
FIG. 8 is a graph showing the dependence of 1/f noise switching on the gate-source voltage at the ON/OFF switching bias of a MOS transistor.

The "OFF state" means a state in which the gatesource voltage of the transistor reaches the threshold voltage or less FIG. 8 shows changes in 1/f noise with respect to the gate-source voltage (Vgs) when the NMOS transistor is switched between two, ON and OFF states. As Vgs changes from 0 to a negative value in the OFF state, 1/f noise decreases.

Figure 9:
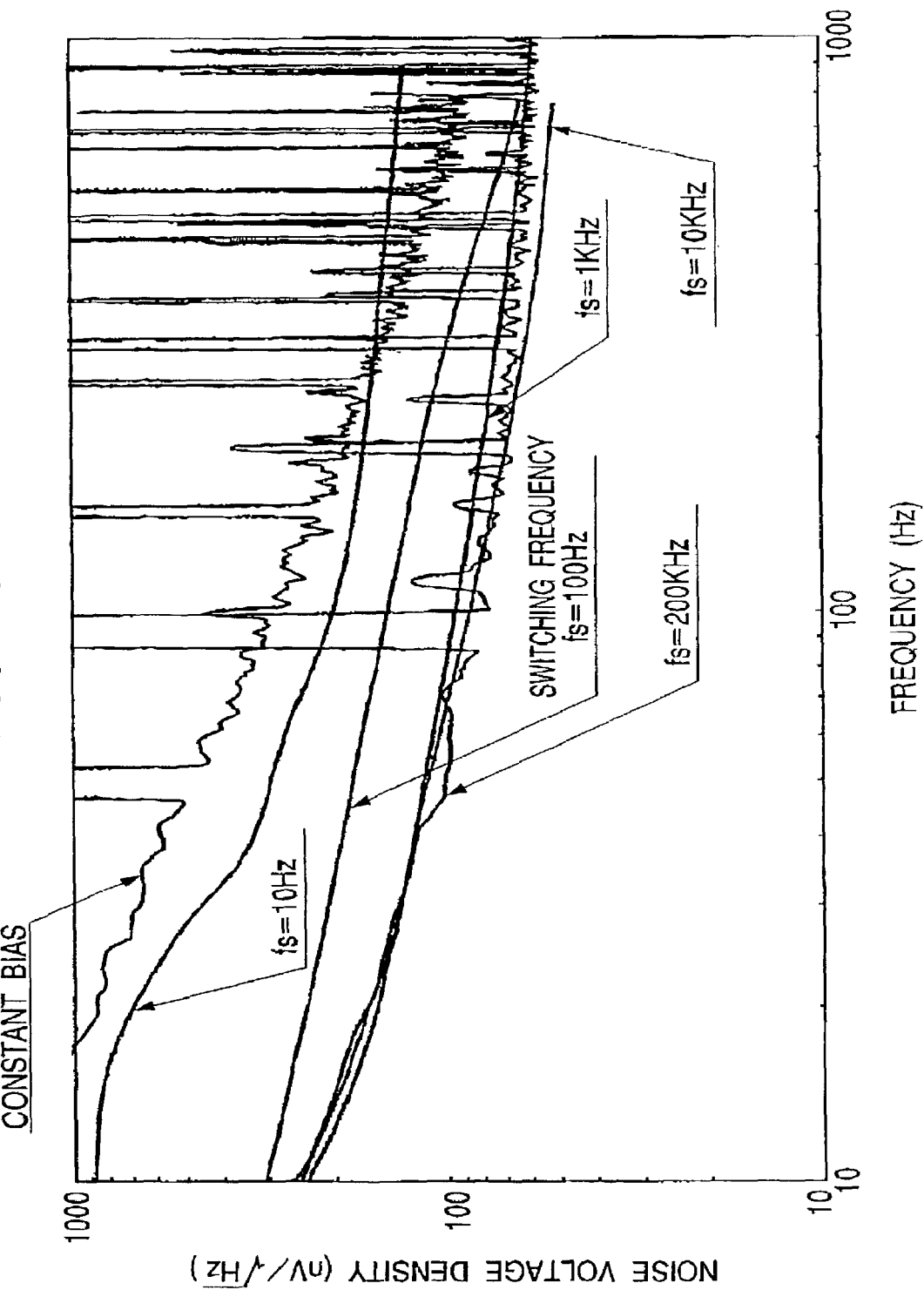
FIG. 9 is a graph showing the dependence of 1/f noise switching on the frequency at the ON/OFF switching bias of the MOS transistor.

From this, the amplifier transistor can be effectively driven via the switch to set the source and gate voltages to be high and low, respectively when the amplifier transistor is an NMOS. Meanwhile, when the amplifier transistor is a PMOS, the source and gate voltages are set to low and high, respectively. FIG. 9 shows the influence of 1/f noise on the switching frequency at the ON/OFF switching bias of the MOS transistor. If the frequency is 1 kHz or more, the 1/f noise reduction effect is sufficiently large. This implies that the 1/f noise reduction effect can be expected even when sensor cells are two-dimensionally arrayed, a video signal is driven at the rate of an NTSC television signal, and an amplifier transistor is driven via a switch during an interval between the read-out period of sensor cell outputs on each row (i.e., no sensor cell output is read out) or frames.

The first embodiment will be described.

Figure 4:
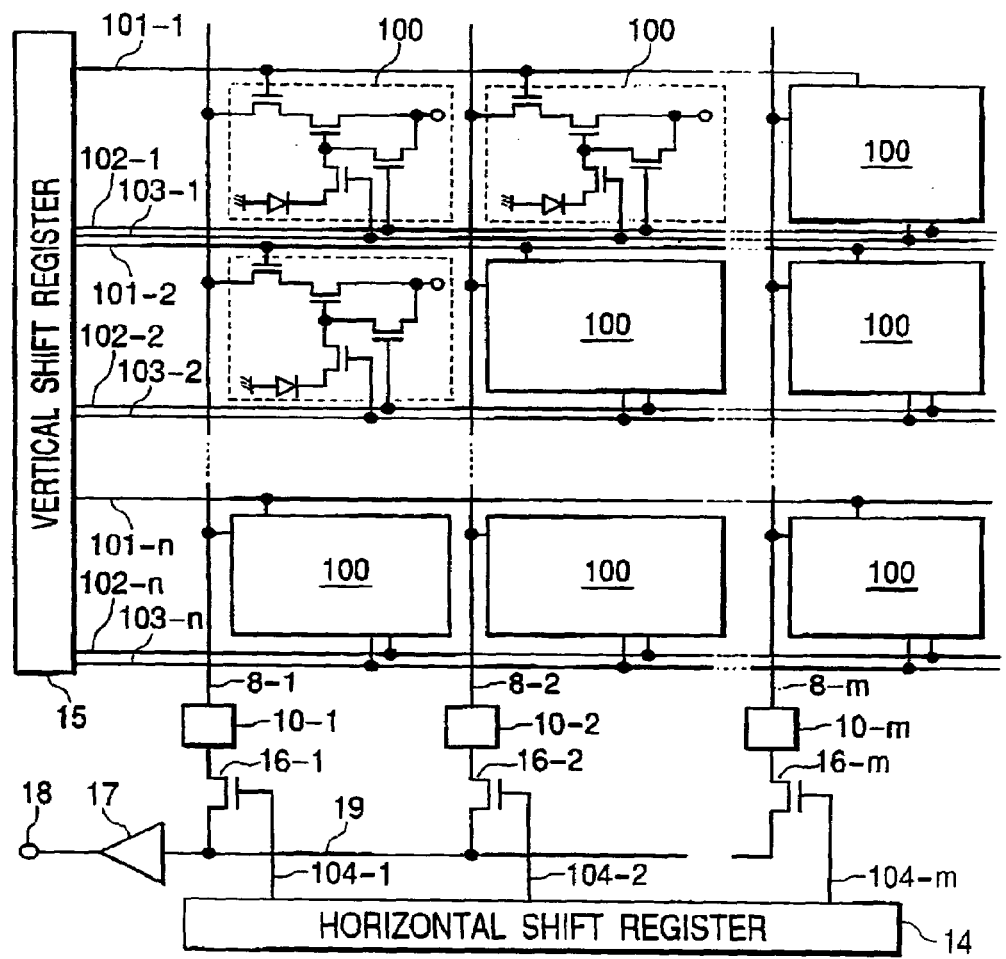
FIG. 4 is a circuit diagram showing the arrangement of another image pickup apparatus.
Figure 10:
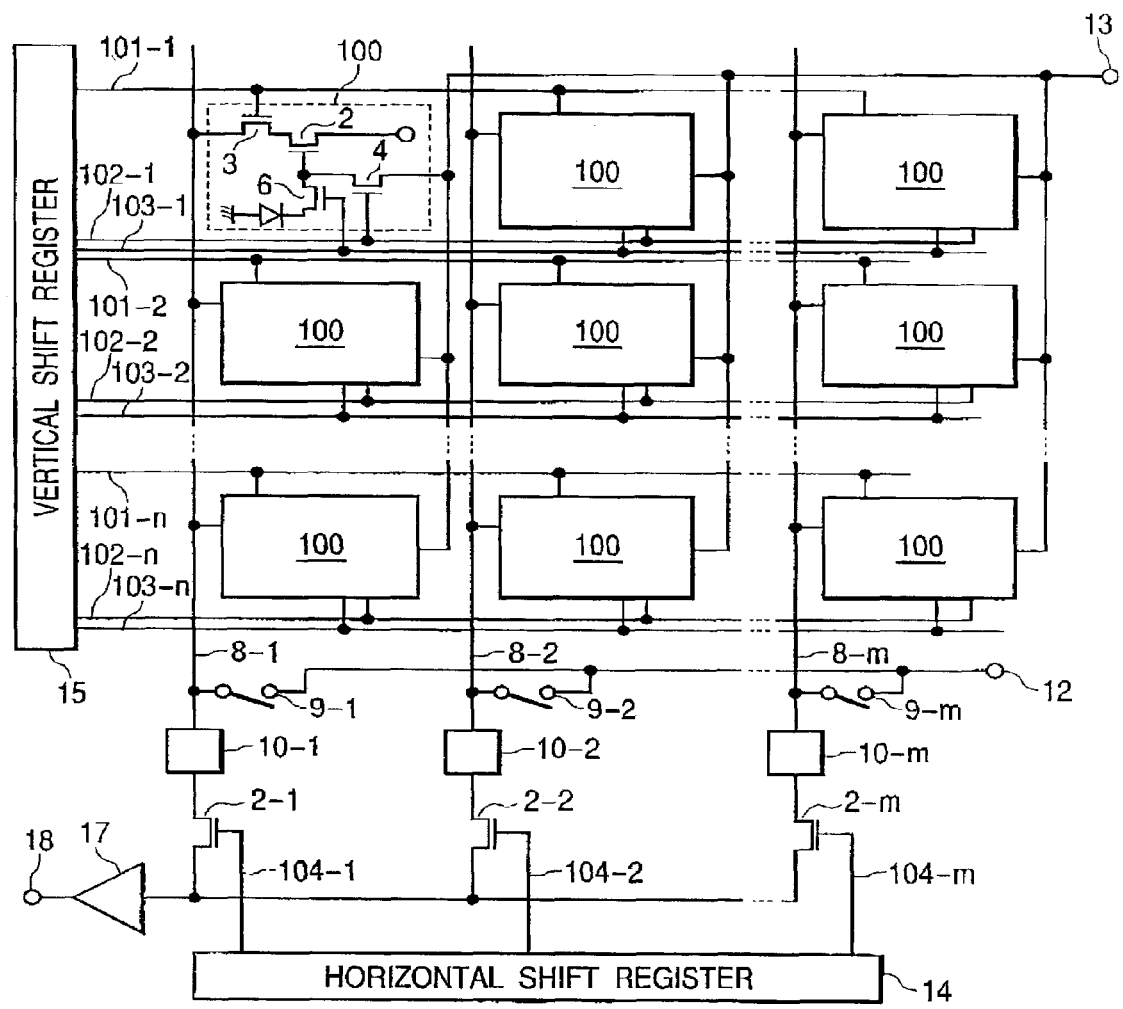
FIG. 10 is a circuit diagram showing the arrangement of an image pickup apparatus according to the first embodiment of the present invention.

FIG. 10 shows the first embodiment according to the present invention. Switches 9 are added to the prior art shown in FIG. 4, and vertical signal lines 8 are driven via the switches 9 by a voltage applied to a terminal 12. This embodiment further adopts a reset voltage input terminal 13 used via a reset transistor 4 in each sensor cell 100. Details of the operation will be explained with reference to the timing chart of FIG. 11. The following description assumes that the amplifier transistor in the sensor cell functions as the source follower of an NMOS transistor. Before a normal signal is read out from a sensor cell 1, a voltage applied to the terminal 13 is adjusted to a given LOW-level voltage. A vertical shift register 15 sets selection signal lines 101 (101-1 to 101-$n$) and reset driving lines 102 (102-1 to 102-$n$) to HIGH level (pulses 2201 and 2202). Each selection switch 3 and reset switch 4 are turned on, and the gate voltage of each amplifier transistor 2 is driven to the value applied to the terminal 13. At the same time, the switch 9 is turned on, and the vertical signal line 8 is driven by a given HIGH-level voltage applied to the terminal 12. The gate voltage of the amplifier transistor 2 becomes equal to the voltage of the terminal 13, whereas the source voltage becomes equal to the voltage of the terminal 12. The gate-source voltage becomes negative, and the amplifier transistor 2 changes to a deep accumulation state, greatly reducing 1/f noise generated in the amplifier transistor 2. After that, the switch 9 is turned off, and the voltage applied to the reset voltage input terminal 13 is set to a normal reset voltage. The output signals of all the sensor cells are read out to the vertical signal lines 8, like the conventional normal read-out operation. In this way, the 1/f noise reduction operation is basically inserted in the conventional signal read-out period. This can reduce 1/f noise without degrading the signal output.

Figure 11:
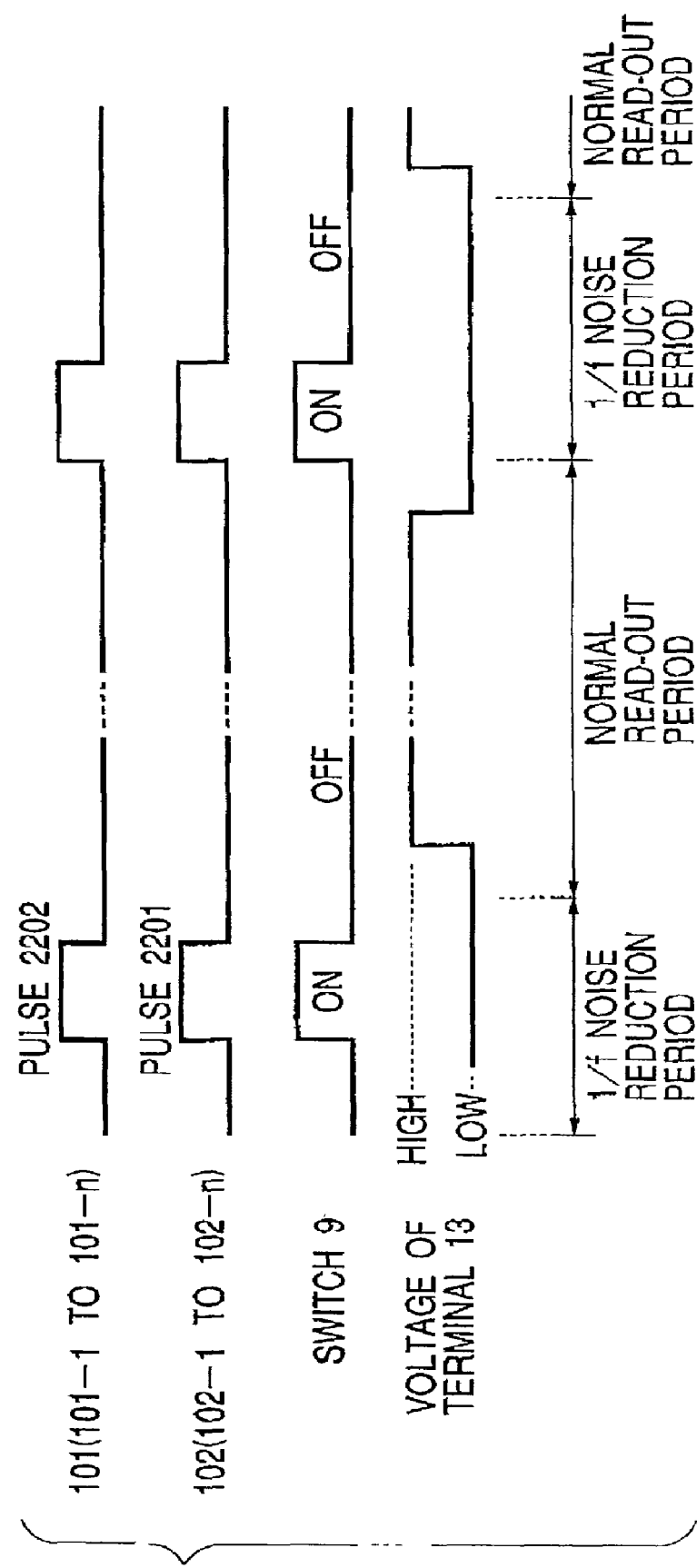
FIG. 11 is a timing chart showing the first driving method of the image pickup apparatus according to the first embodiment of the present invention.
Figure 12:
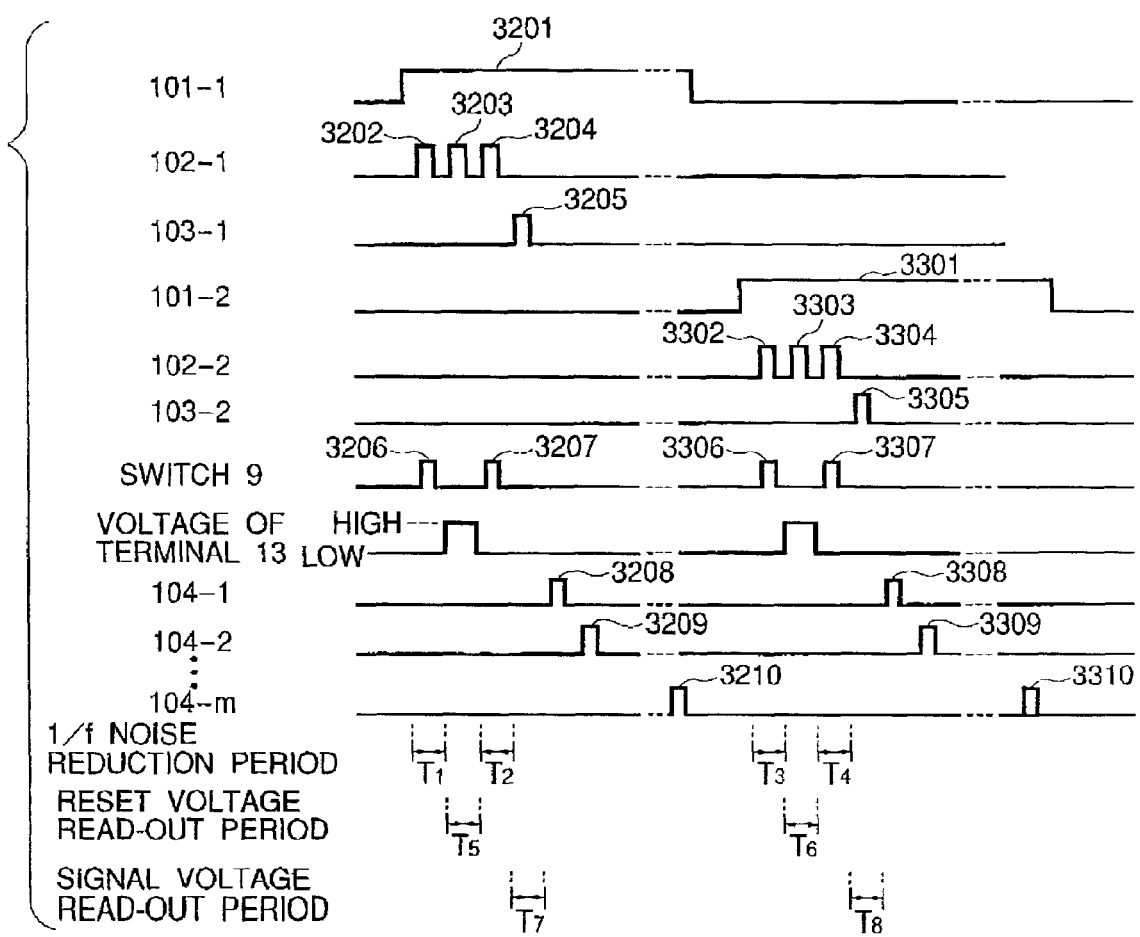
FIG. 12 is a timing chart showing the second driving method of the image pickup apparatus according to the first embodiment of the present invention.

FIG. 12 shows more detailed operation timings than FIG. 11 of the embodiment of FIG. 10. The 1/f noise reduction period in FIG. 11 is set between the read-out periods of sensor signals on respective rows.

Figure 13:
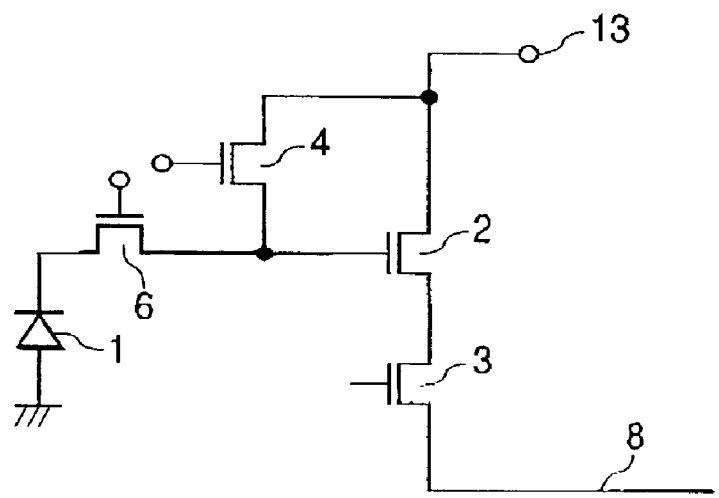
FIG. 13 is a circuit diagram showing the second sensor cell arrangement used in the image pickup apparatus of FIG. 10.
Figure 14:
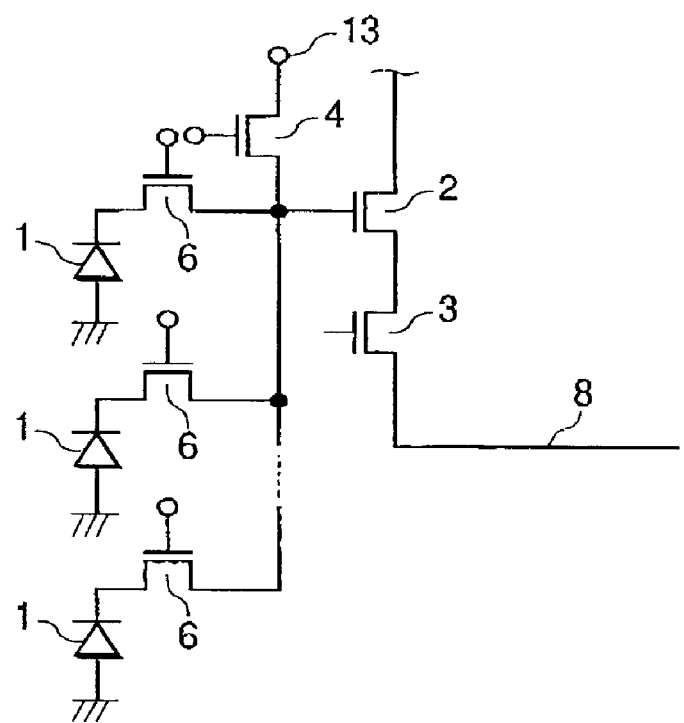
FIG. 14 is a circuit diagram showing the third sensor cell arrangement used in the image pickup apparatus of FIG. 10.

The reset switches 4 and selection switches 3 in sensor cells on the first row are turned on by pulses 3201 and 3202 from the vertical shift register. At the same time, the reset voltage value applied to the terminal 13 is changed to LOW level, thus turning on the switches 9 (pulse 3206). Similar to FIG. 10, the amplifier transistors 2 in sensor cells on the first row can be set to an accumulation state. Then, the voltage of the terminal 13 returns to a normal reset voltage (HIGH level) and is reset by a pulse 3203, and the reset voltage is output to noise elimination circuits 10. The voltage of the terminal 13 is changed to LOW level, and 1/f noise reduction operation is performed by pulses 3204 and 3207. Signal charges in photodiodes are transferred by a signal transfer pulse 3205 to the gate terminals of the amplifier transistors in the sensor cells. The signal voltages are output to the noise elimination circuits 10, eliminating noise caused by manufacturing variations. The noise-eliminated signals are output from the noise elimination circuits 10, horizontal selection signal switches are sequentially turned on by pulses 3208 to 3210, and signals are read out via an output amplifier 17. Pulses 3301 and 3302 and a pulse 3306 applied to the switches 9 reduce 1/f noise in the amplifier transistors 2 of sensor cells on the second row. Similar to the sensor cells on the first row, normal reset voltage setting, 1/f noise elimination, signal voltage read-out operation, and horizontal transfer are executed by pulses 3303, 3304, 3307, 3305, and 3308 to 3310. During periods T1 to T4 in FIG. 12, 1/f noise reduction operation is performed. T5 and T6 are reset voltage read-out periods, and T7 and T8 are signal voltage read-out periods. A reset voltage line in FIG. 10 may be used for a high-voltage source connected to the amplifier transistor 2, as shown in FIG. 13. and the number of wiring lines connected to sensor cells may be decreased. Instead of newly arranging the switch 9 in FIG. 10, a conventionally used switch may be used to drive the output terminal of the amplifier transistor in the sensor cell to a given voltage, thereby setting the amplifier transistor to the accumulation state. Also, a high-density sensor as shown in FIG. 14 in which a plurality of photoelectric conversion elements such as photodiodes in sensor cells are arranged with their outputs being connected to the input terminal of one amplifier transistor can adopt the same driving method and obtain the 1/f noise reduction effect.

Figure 5:
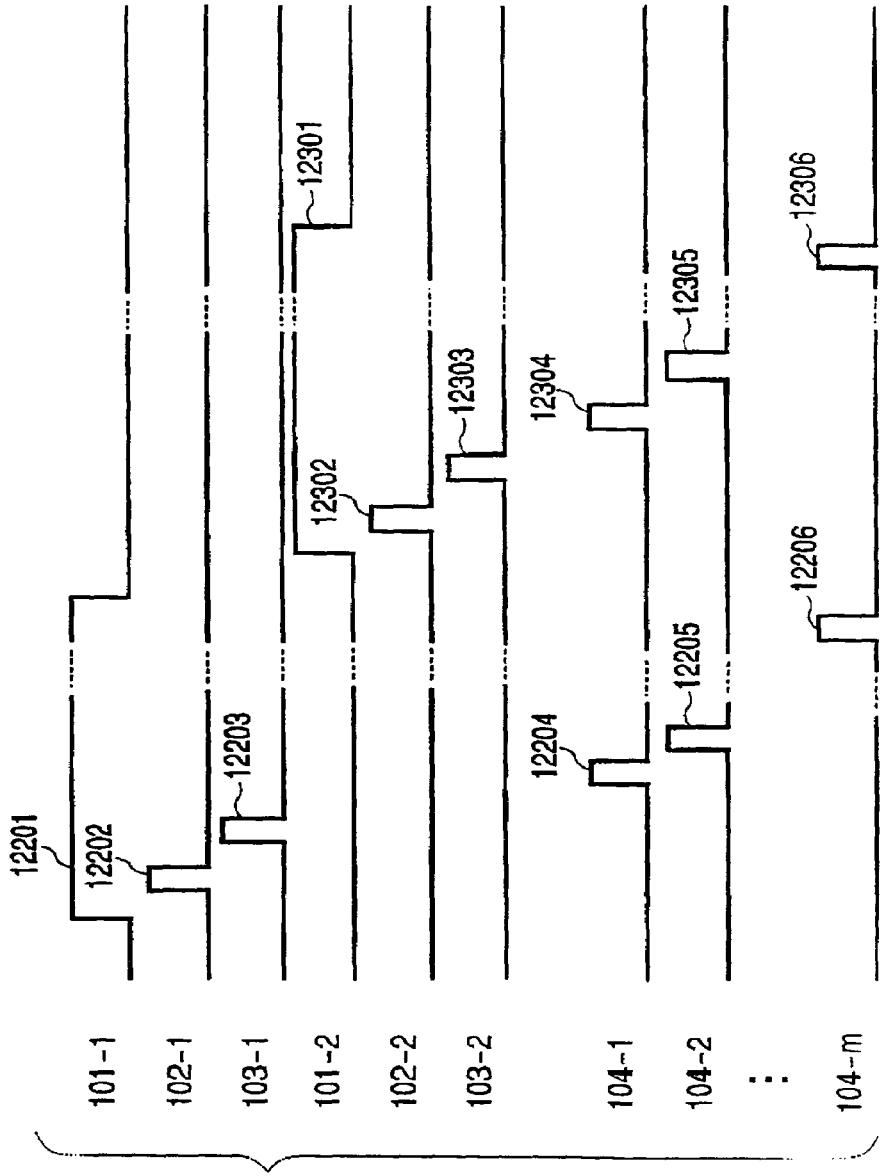
FIG. 5 is a timing chart showing the driving method of the conventional image pickup apparatus shown in FIG. 4.
Figure 6:
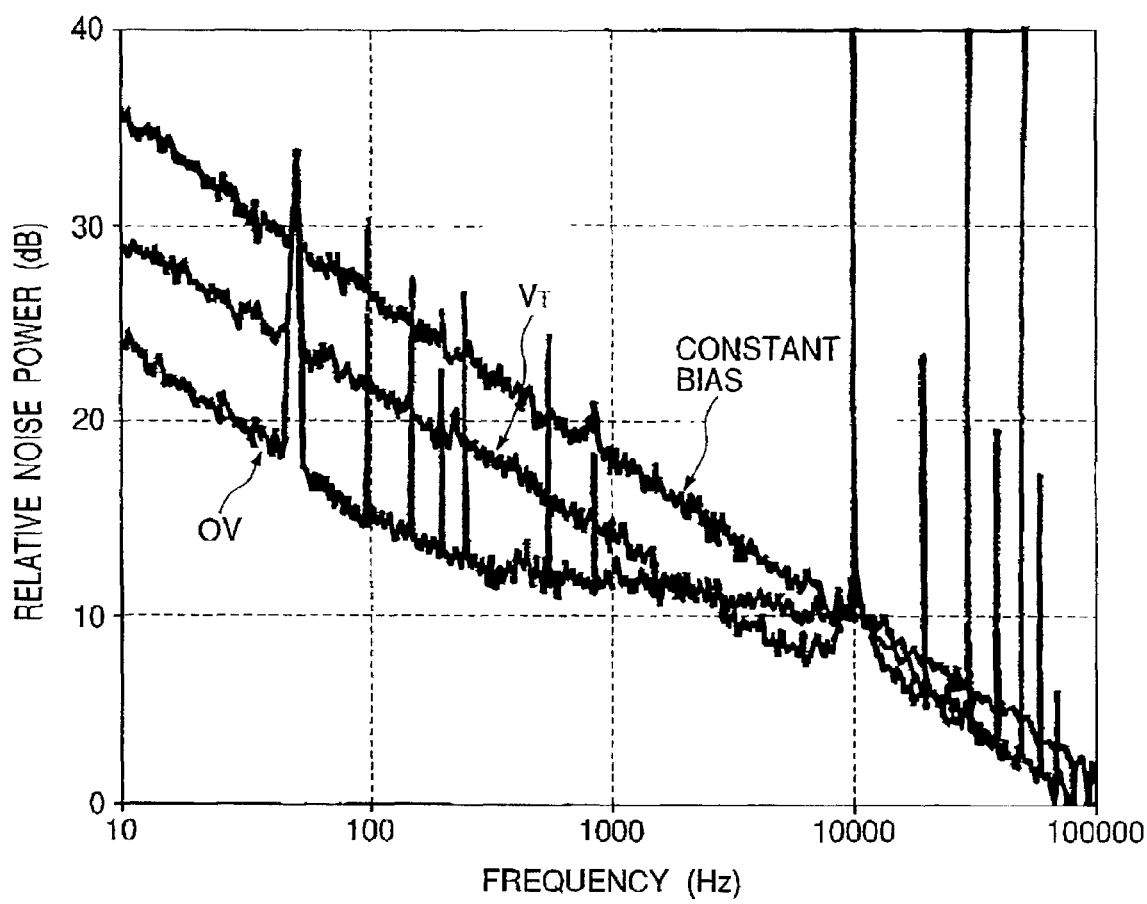
FIG. 6 is a graph showing a 1/f noise measurement example for a duty cycle of 50%.
Figure 7:
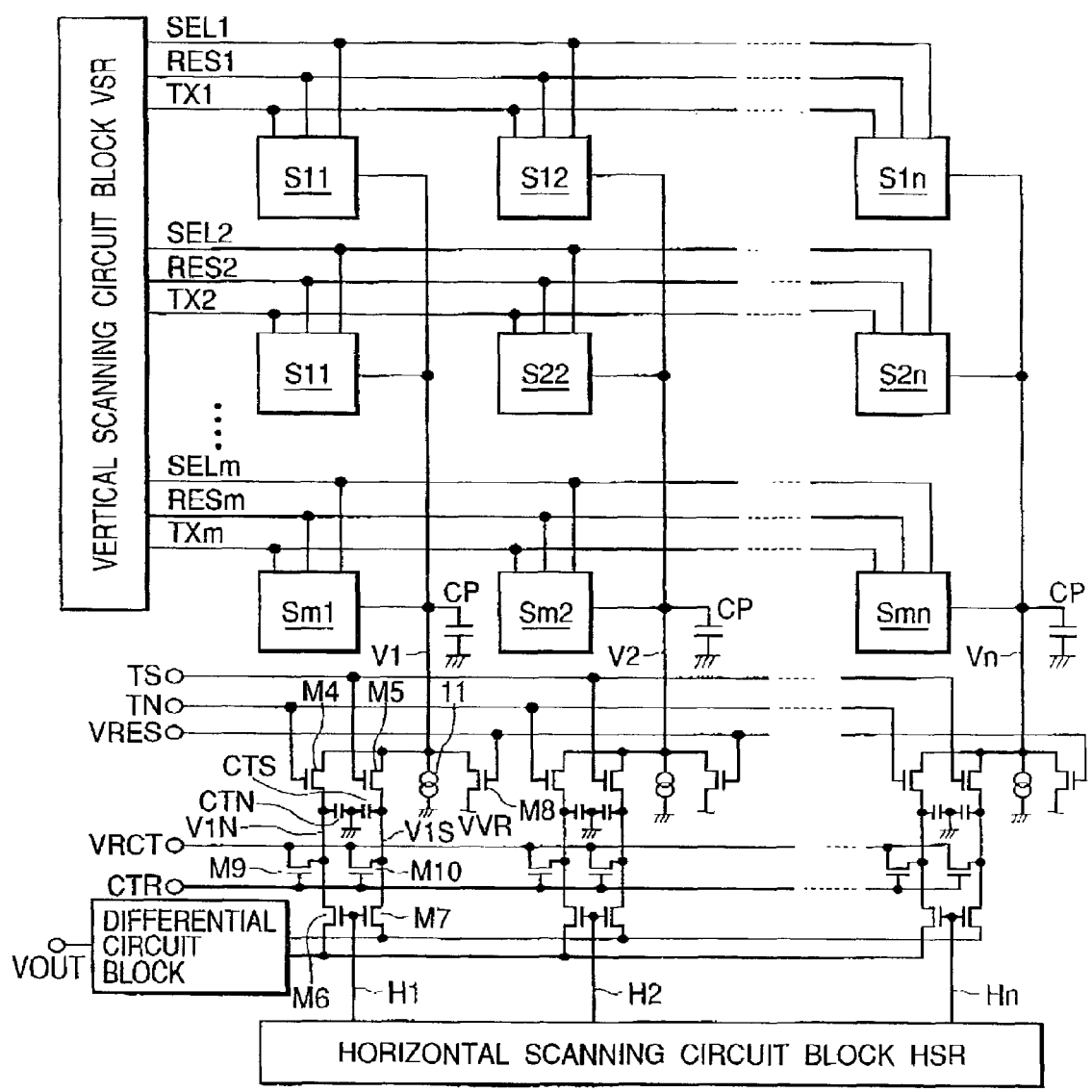
FIG. 7 is a circuit diagram showing the arrangement of still another conventional image pickup apparatus.
Figure 15:
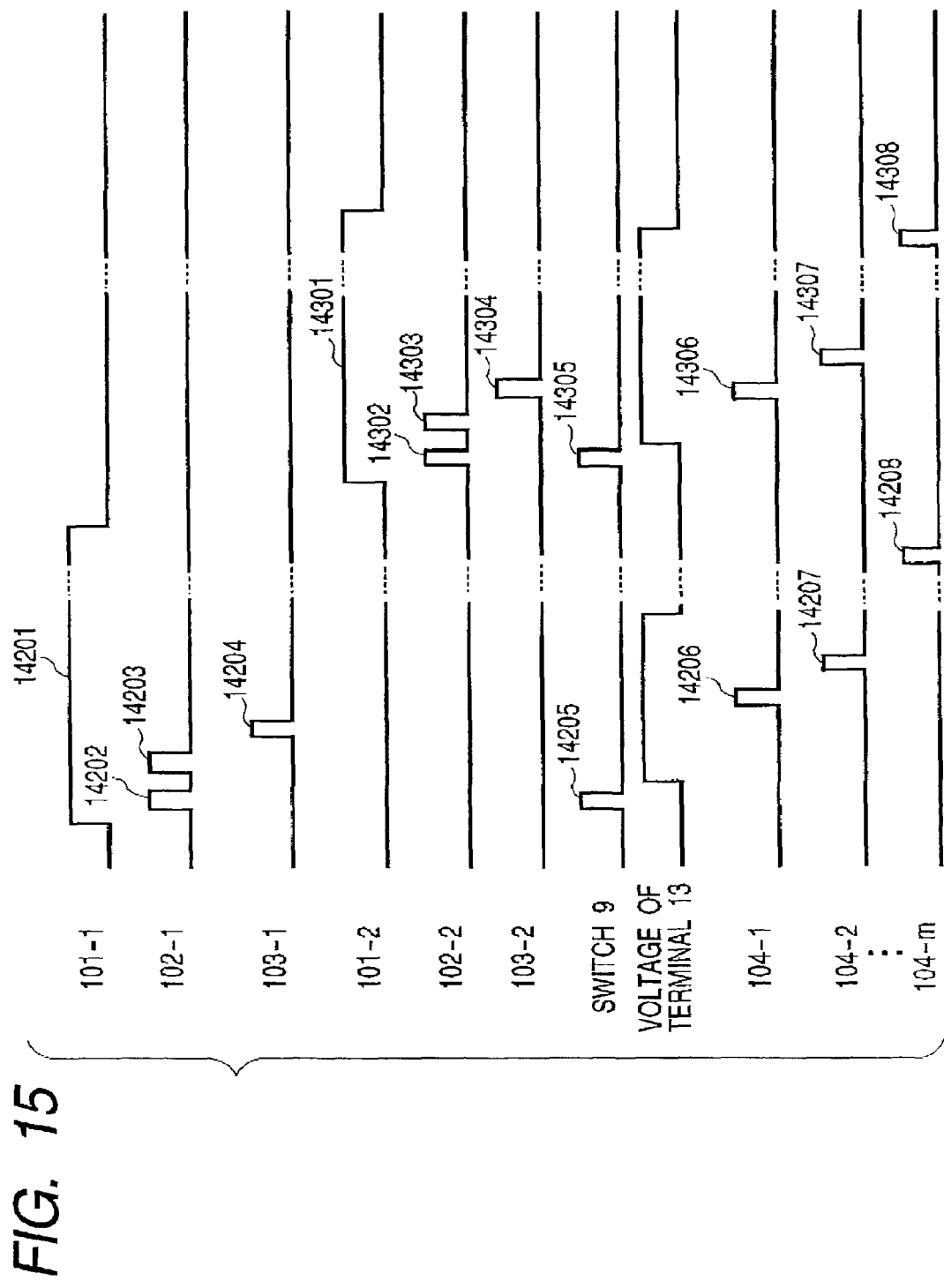
FIG. 15 is a timing chart showing the third driving method of an image pickup apparatus according to the second embodiment of the present invention shown in FIG. 10.

FIG. 15 shows still another timing driving example different from these two operation timings in the embodiment of FIG. 10 FIG. 15 shows a case in which 1/f noise reduction operation is performed only before the sensor cell is reset. Pulses for performing 1/f noise reduction operation of the amplifier transistor in the sensor cell are inserted for the conventional circuit arrangement and operation timings in FIGS. 4 and 5 sensor cells on the first row are selected and activated by a pulse 14201. The voltage of the terminal 13 is changed to LOW level at the same time as a pulse 14202 for driving a reset signal line and a reset pulse 14205 of the vertical signal line 8. As a result, the amplifier transistor 2 in the sensor cell changes to the OFF state or accumulation state, thereby reducing 1/f noise. The voltage of the terminal 13 returns to a normal reset level (HIGH), the sensor cell is reset by a pulse 14203, and an output (Vres) at this time is read out to the vertical signal line 8 and output to the noise elimination circuit 10. A transfer switch 6 in the sensor cell is turned on by a pulse 14204 to transfer signal charges generated in the photodiode to the gate of the amplifier transistor 2. An output (Vsig) corresponding to the charges appears on the vertical signal line and is output to the noise elimination circuit 10.

The noise elimination circuit 10 outputs two differential signals Vres and Vsig Noise-eliminated sensor signals are sequentially supplied to the input of the output amplifier 17 by pulses 14206 to 14208 for driving a horizontal transfer switch, and are output from an output terminal 18. By similarly driving sensor cells on the second and subsequent rows, 1/f noise in the amplifier transistor 2 in each sensor cell can be reduced. A sensor signal can be obtained while the noise elimination circuit 10 eliminates noise caused by variations in the threshold voltage of the amplifier transistor. When the selection switch 3 is inserted between the amplifier transistor 2 and the power supply in the circuit arrangement of the sensor cell, as shown in FIG. 16, the selection pulses (2202 in FIG. 11) can be omitted from the 1/f noise reduction operation period in FIGS. 11, 12, and 15.

If the reset voltage of the terminal 13 set to reduce 1/f noise in FIG. 10 can be set sufficiently low or if the voltage of the terminal 12 which applies a voltage to the vertical signal line via the switch 9 can be set sufficiently high, only either the gate or source terminal of the amplifier transistor 2 in the sensor cell may be driven to reduce 1/f noise. Because, such the setting also enables changing the amplifier transistor to the OFF state or accumulation state.

Figure 16:
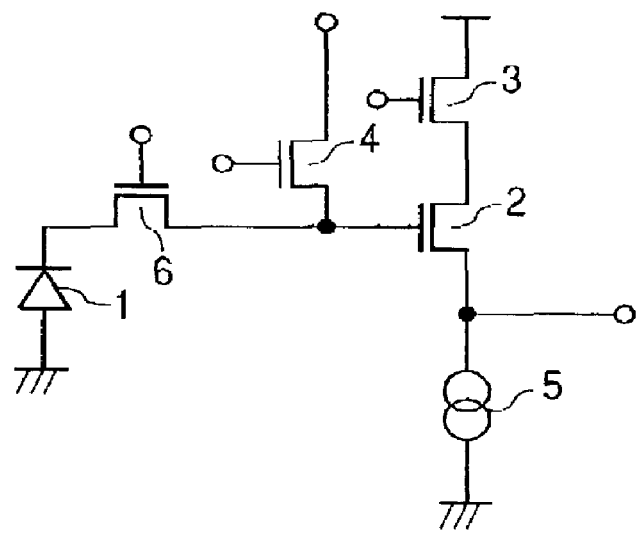
FIG. 16 is a circuit diagram showing the fourth sensor cell arrangement used in the image pickup apparatus of FIG. 10.
Figure 17:
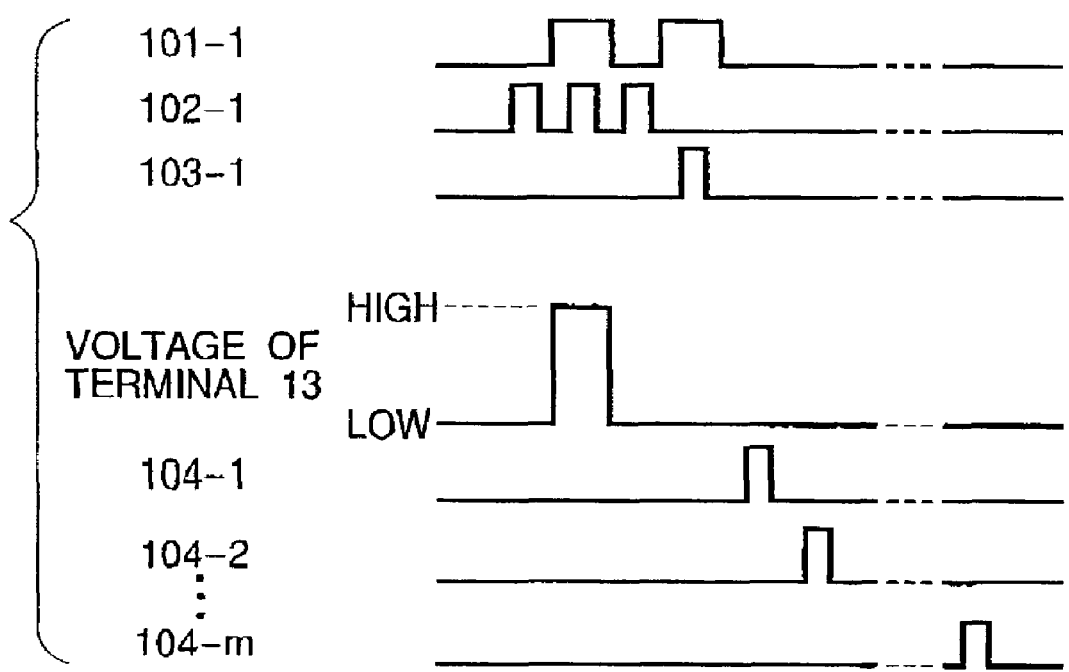
FIG. 17 is a timing chart showing the driving method of the image pickup apparatus according to the second embodiment of the present invention shown in FIG. 10 in the use of the sensor cell in FIG. 16.

FIG. 17 shows a modification of the timing chart of FIG. 12 when the setting voltage of the terminal 13 in FIG. 10 can be set sufficiently low in 1/f noise reduction operation in the use of a sensor cell having the arrangement of FIG. 16. A pulse 101.1 is applied only in normal reset of the gate terminal of the amplifier transistor and in transfer of a signal from the photodiode. Since the reset voltage of the terminal 13 is satisfactorily low in 1/f noise reduction operation, the pulses 3206 and 3207 applied to the switch 9 in FIG. 12 are omitted, which is different from the timing chart of FIG. 12.

Figure 3:
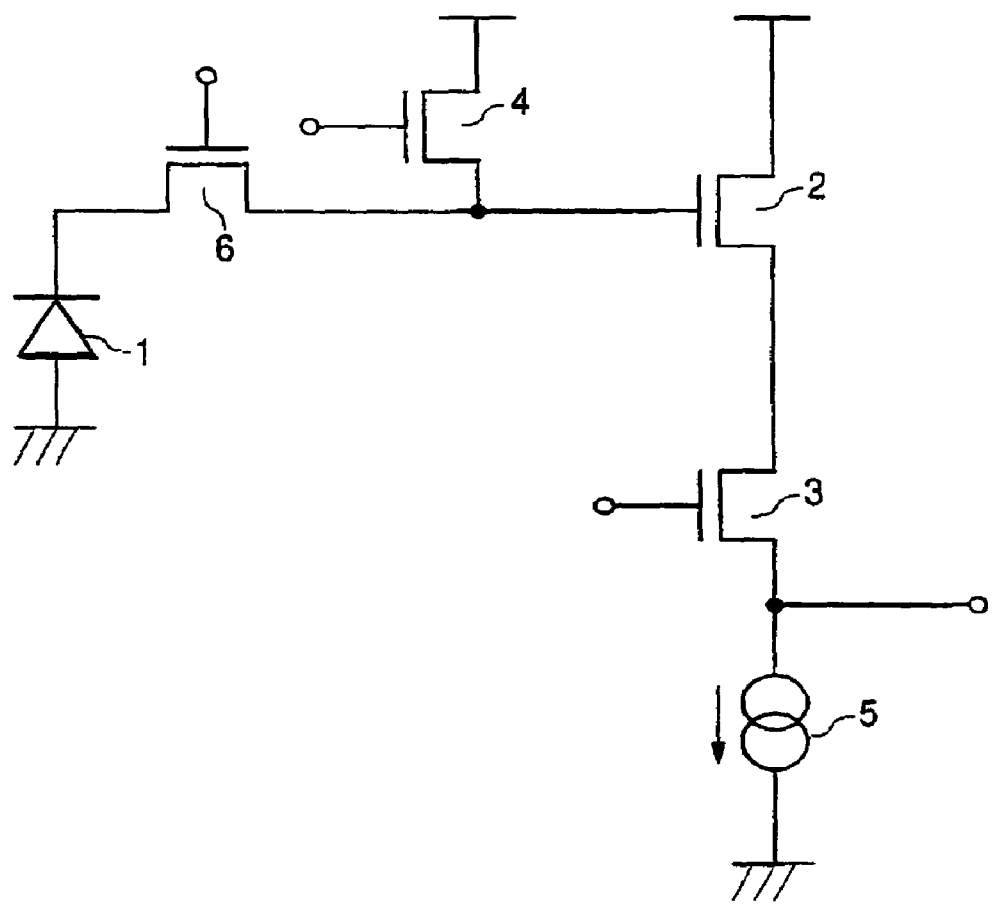
FIG. 3 is a circuit diagram showing the arrangement of another conventional sensor cell.
Figure 18:
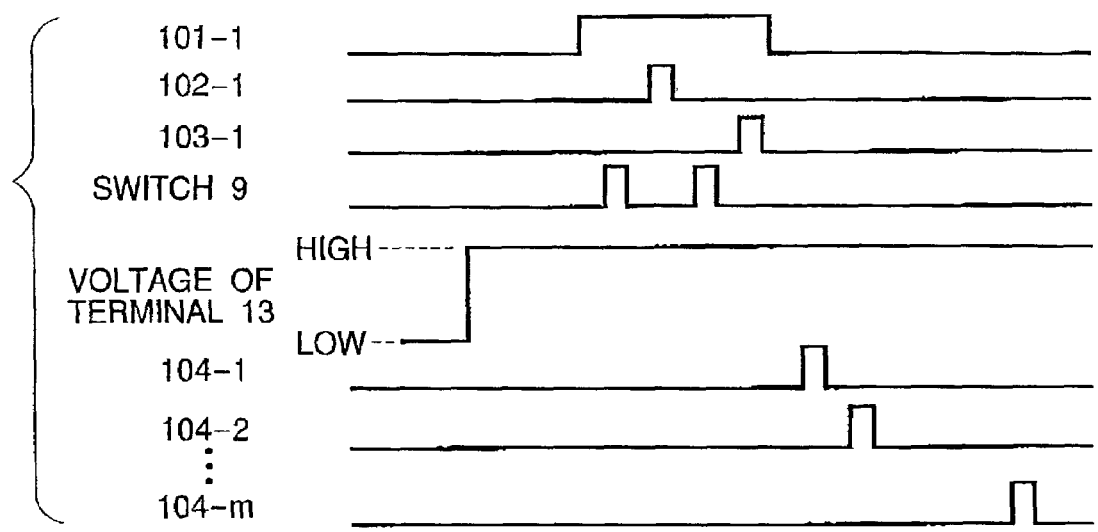
FIG. 18 is a timing chart showing the fourth driving method of the image pickup apparatus according to the first embodiment of the present invention shown in FIG. 10.

FIG. 18 shows another modification of FIG. 12 when the voltage of the terminal 12 applied to the switch 9 in FIG. 10 can be set sufficiently high in the use of a sensor cell having the arrangement of FIG. 3. The pulses 3202 and 3204 for driving the gate terminal of the amplifier transistor in the sensor cell are omitted from the 1/f noise reduction operation period in FIG. 12, and the voltage of the terminal 13 is kept at a constant value set to perform normal reset, which is different from the timing chart of FIG. 12.

Figure 19:
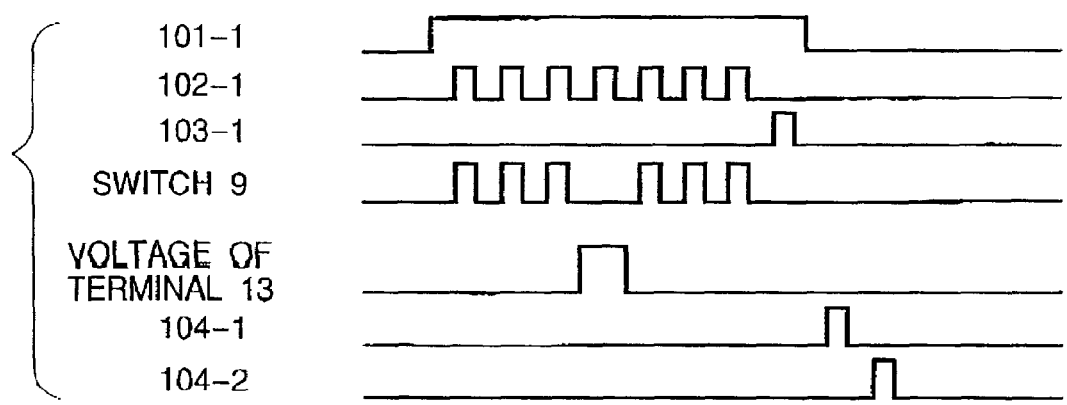
FIG. 19 is a timing chart showing the fifth driving method of the image pickup apparatus according to the first embodiment of the present invention shown in FIG. 10.

In FIG. 19, each of the pulses 3202, 3204, 3206, and 3207 applied during the 1/f noise reduction period upon generation of driving timings in FIG. 12 is not single pulses but a plurality of pulses each (three pulses each in this example). This is based on the switching frequency dependence of the 1/f noise reduction effect in FIG. 9. The pulse application method copes with the fact that the effect is greater for a higher switching frequency. A plurality of pulses are applied to the source terminal in this example, but may be applied to the gate.

The second embodiment will be described.

Figure 20:
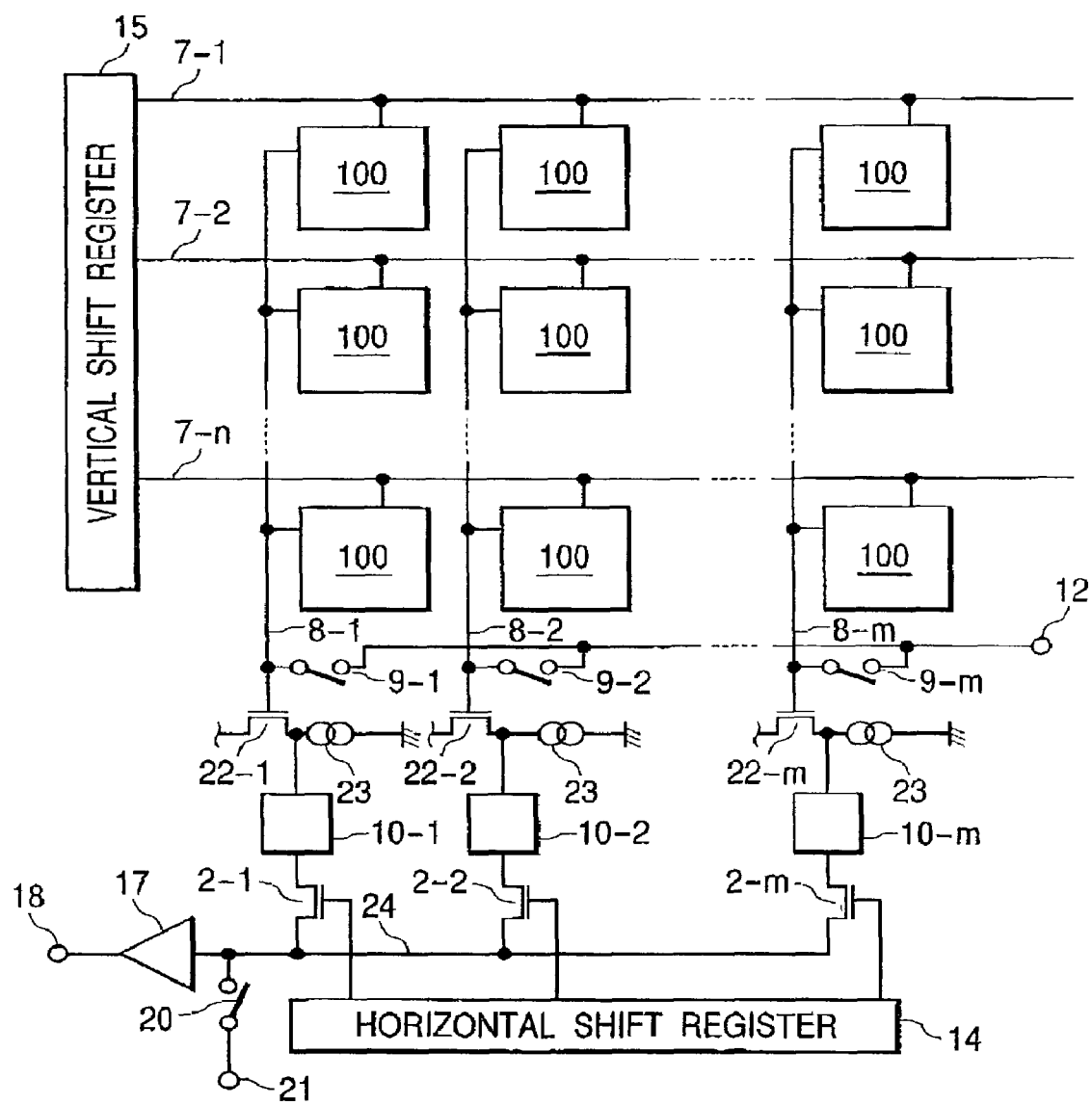
FIG. 20 is a circuit diagram showing the arrangement of an image pickup apparatus according to the second embodiment of the present invention.

FIG. 20 shows the second embodiment according to the present invention. The purpose of the second embodiment is to reduce 1/f noise in source follower transistors 22 when the impedance conversion source follower circuits 22 (22-1, 22-2, . . . ) are connected to common vertical signal lines 8 (8-1, 8-2, . . . ) of two-dimensionally arrayed sensor cells 100. In many cases, the output of each source follower 22 is connected to a noise elimination circuit 10, similar to the first embodiment. The output of the noise elimination circuit 10 is connected to a horizontal transfer switch 2, and an output signal from the sensor cell via the switch is output from an output terminal 18 via a common horizontal signal line 24 and output amplifier 17. Voltages applied to terminals 12 and 21 upon tuning on switches 9 and 20 are applied to the gate and source terminals of the source follower transistors 22 via the switches 9 (9-1, 9-2, . . . ) and switch 20 added to the common vertical lines 8 and common horizontal signal line 24, respectively. By adjusting the voltages applied to the terminals 12 and 21, the source follower 22 can be changed to the OFF state or accumulation state, and 1/f noise in the transistor 22 can therefore be reduced.

At this time, the noise elimination circuit 10 is set to a through state. Similar to the first embodiment, 1/f noise reduction operation is executed during the period of reading out sensor cell outputs on each row or the period of reading out all sensor cell signals without influencing a read-out signal. The switches 9 and 20 necessary to perform 1/f noise reduction operation are added to the prior art but hardly increase the sensor chip area.

The third embodiment will be described.

Figure 1:
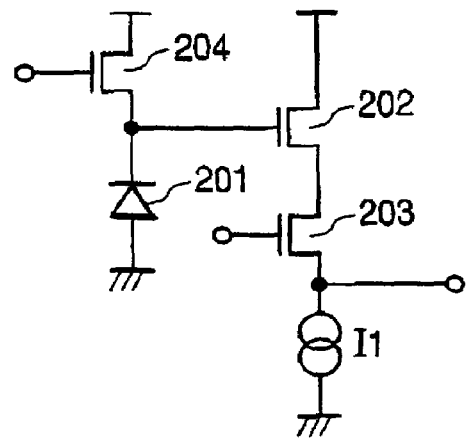
FIG. 1 is a circuit diagram showing the arrangement of a conventional sensor cell.
Figure 2:
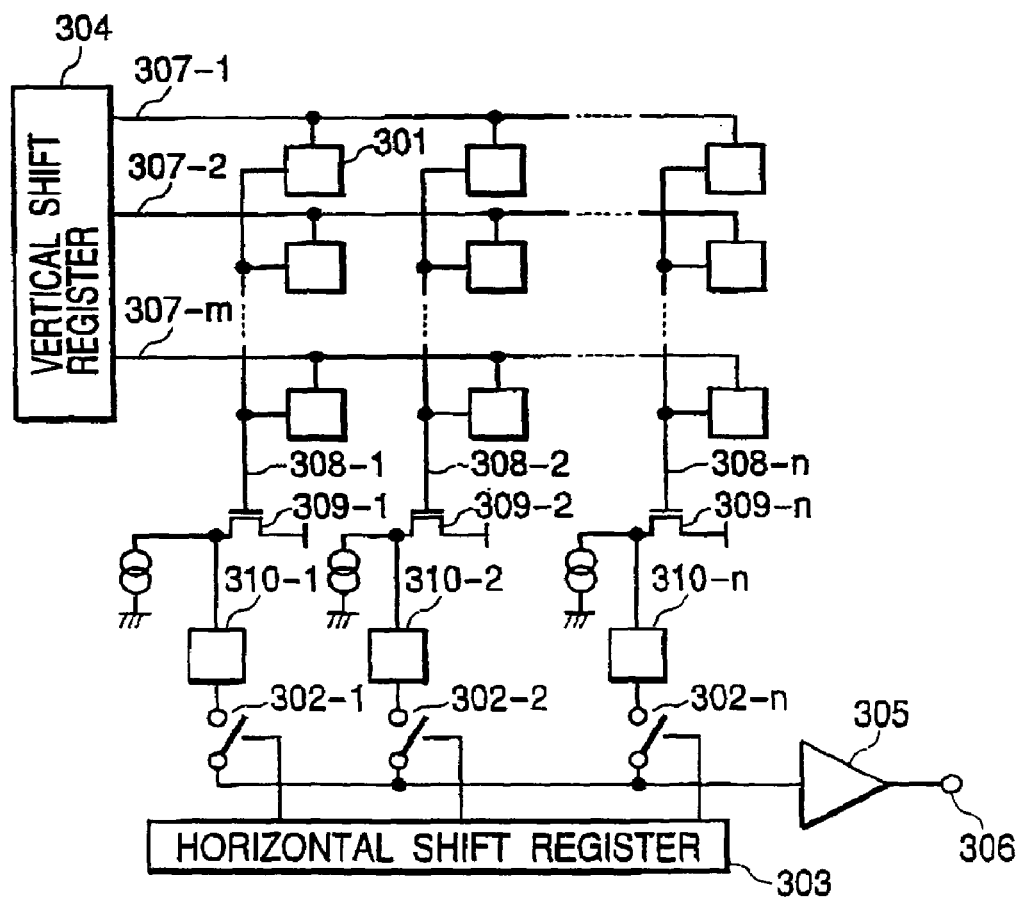
FIG. 2 is a block diagram showing the arrangement of a conventional image pickup apparatus.
Figure 21:
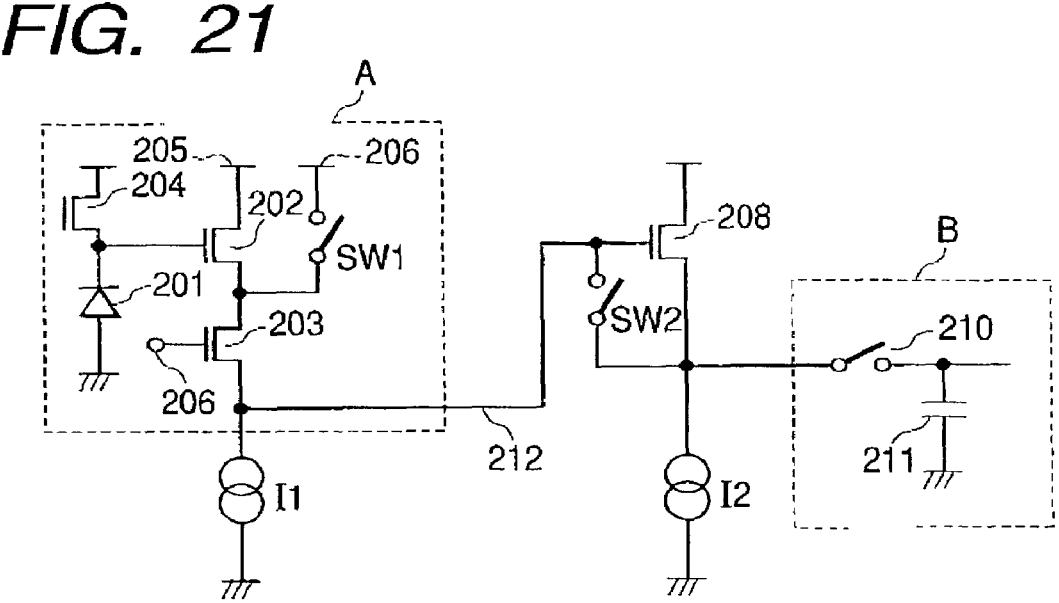
FIG. 21 is a circuit diagram showing an example of a sensor cell A, an impedance conversion circuit, and the sample/hold circuit of a noise reduction circuit B according to the third embodiment of the present invention.

An image pickup apparatus according to the third embodiment has an overall arrangement as shown in FIG. 21. In the third embodiment, the conventional sensor cell shown in FIG. 1 is replaced by a sensor cell shown in FIG. 21.

FIG. 21 shows the third embodiment according to the present invention. A vertical signal line 212 connected to the output of a sensor cell A, a source follower made up of a bias current source I2 and an impedance conversion transistor 309 connected to the vertical signal line 212, and a noise elimination circuit B connected to the output of the source follower circuit are added to the prior art of FIG. 1. The noise elimination circuit B is exemplified as a sample/hold circuit made up of a switch 210 and capacitor 211, and a subtraction circuit subsequent to the sample/hold circuit is not illustrated. In the sensor cell A, a switch SW1 is connected to the source terminal of an amplifier transistor 202. When the sample/hold circuit B is in a hold state, SW1 is switched once or a plurality of number of times so as not to influence the final output while reducing 1/f noise in the amplifier transistor 202. This also applies to a source follower 309. A switch SW2 is interposed between the gate and source terminals. When the sample/hold circuit B of a noise elimination circuit 310 is in the hold state, SW2 is switched once or a plurality of number of times, thereby reducing 1/f noise in the source follower transistor 309.

Figure 22:
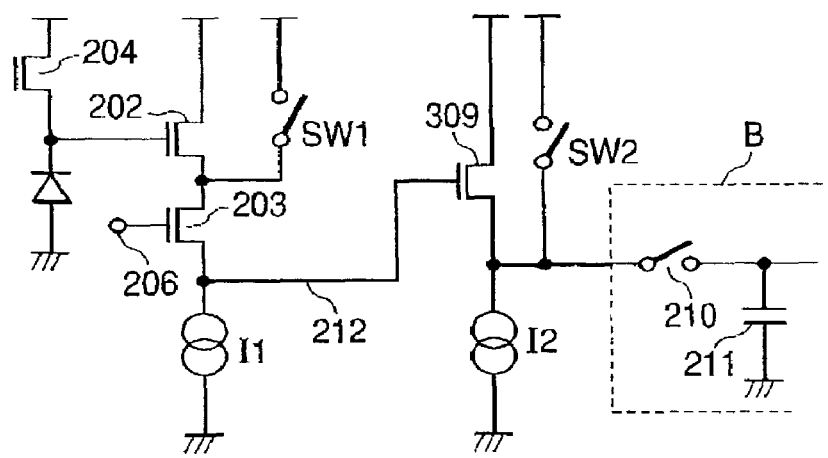
FIG. 22 is a circuit diagram showing another example of the sensor cell A, the impedance conversion circuit, and the sample/hold circuit of the noise reduction circuit B according to the third embodiment of the present invention.

In FIG. 22, the switch SW2 inserted in the source follower 309 in FIG. 21 is changed to pull-up type. The operation and effect as the same as those of FIG. 21.

Figure 23:
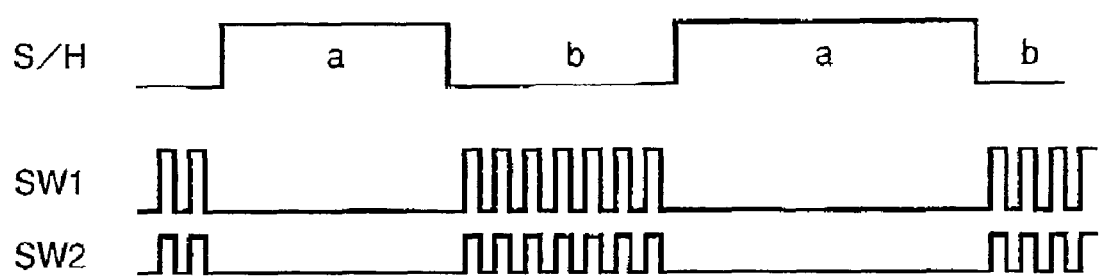
FIG. 23 is a timing chart for explaining the operation of an image pickup apparatus according to the third embodiment of the present invention.

FIG. 23 shows the timings of operations in FIGS. 21 and 22. S/H represents the mode of the sample/hold circuit B in FIGS. 11 and 12; a, a sample mode; and b, a hold mode. SW1 and SW2 are switched when the sample/hold circuit B is in the hold mode, as shown in FIG. 23. The frequency at this time is set higher (desirably twice or more) than the frequency band of a subsequent stage such as a sensor cell or source follower. This can further reduce the influence of switching operation on an output.

In the first to third embodiments, the transistor is an NMOS transistor. Alternatively, some or all of transistors may be bipolar transistors or various transistors. When the MOS transistor is replaced with a bipolar transistor, the gate, source, drain, and source follower are respectively replaced with a base, emitter, collector, and emitter follower. In the present invention, the control electrode is, e.g., a gate or base, and the main electrode is, e.g., a source or emitter.

Figure 24:
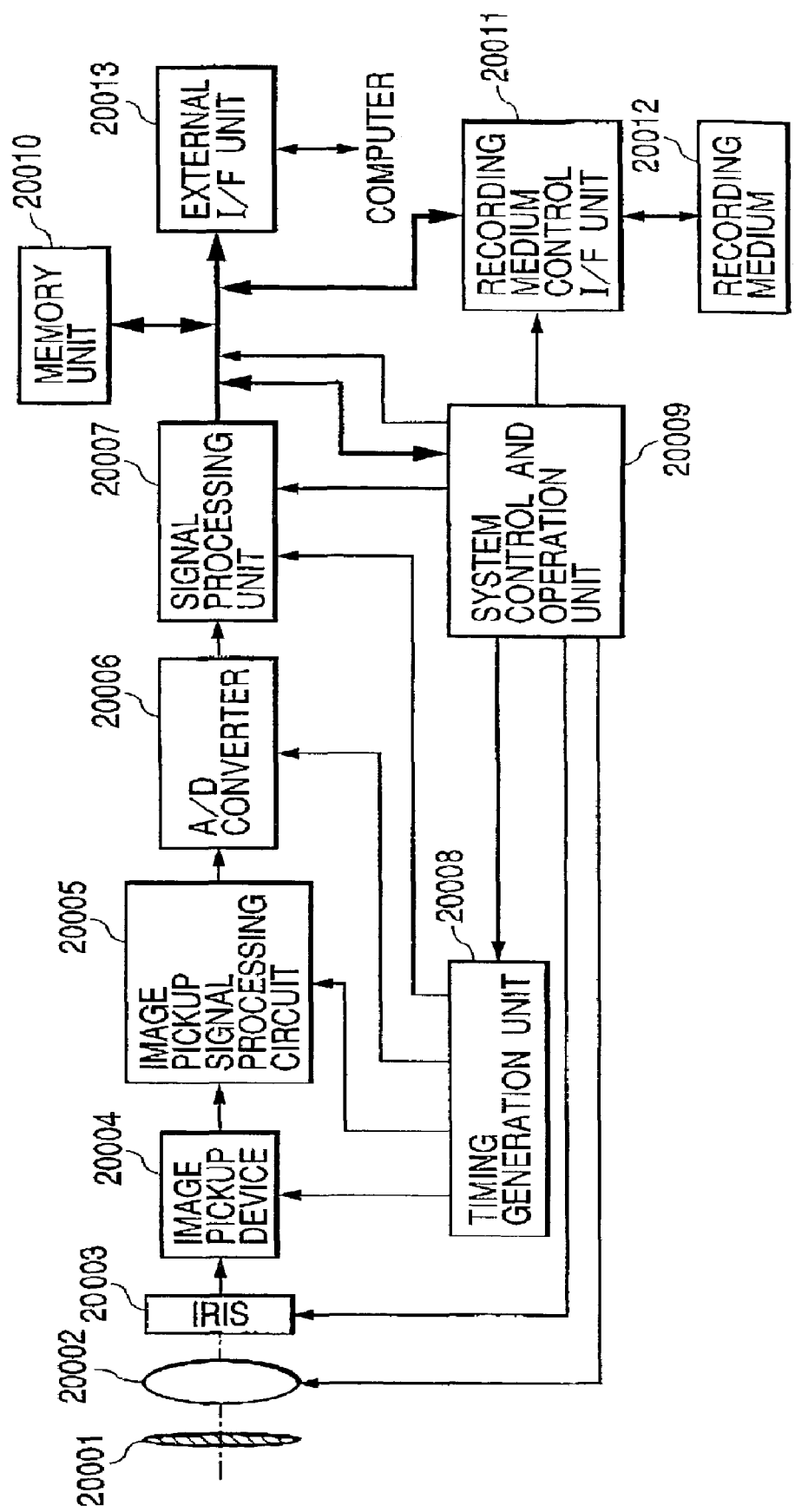
FIG. 24 is a block diagram showing the arrangement of a digital still camera according to the fourth embodiment of the present invention.

An embodiment in which the arrangement described in any one of the first to third embodiments is applied to an image pickup device (digital still camera) will be explained in detail with reference to FIG. 24.

In FIG. 25, a barrier 20001 serves as both a lens protect and main switch. A lens 20002 forms the optical image of an object to be picked up onto an image pickup device 20004. An iris 20003 changes the light quantity passing through the lens 20002. The image pickup device 20004 receives the formed object image as an image signal, and has been described in the first to third embodiments. An A/D converter 20006 A/D-converts the image signal output from the image pickup device 20004. A signal processing unit 20007 performs various correction processes for image data-output from the A/D converter 20006 or compresses data. A timing generation unit 20008 outputs various timing signals to the image pickup device 20004, an image pickup signal processing circuit 20005, the A/D converter 20006, and the signal processing unit 20007. A system control and operation unit 20009 controls various operations and the entire still video camera. A memory unit 20010 temporarily stores image data. An interface unit 20011 records data on a recording medium or reads out data from the recording medium. A detachable recording medium 20012 is implemented by a semiconductor memory or the like for recording or reading out image data. An interface 20013 communicates with an external computer or the like.

The operation of the still video camera in image pickup with the above-described arrangement will be described.

The barrier 20001 is opened, and then the main power is turned on. The control system is powered on, and the image pickup system circuit such as the A/D converter 20006 is powered on.

In order to control the exposure amount, the system control and operation unit 20009 sets the iris 20003 to a full-aperture state. A signal output from the image pickup device 20004 is converted by the A/D converter 20006 and input to the signal processing unit 20007.

The system control and operation unit 20009 executes exposure operation on the basis of the obtained data.

The brightness is determined from the result of photometry, and the system control and operation unit 20009 controls the iris in accordance with the result.

The system control and operation unit 20009 extracts a high-frequency component from the signal output from the image pickup device 20004, and calculates the distance to the object. By driving the lens, whether the image is in focus is checked. If the image is determined to be out of focus, the lens is driven again to measure the distance.

After the image is confirmed to be in focus, actual exposure starts.

After exposure ends, an image signal output from the image pickup device 20004 is A/D-converted by the A/D converter 20006, and is written in the memory unit by the system control and operation unit 20009 via the signal processing unit 20007.

Data stored in the memory unit 20010 are recorded on the detachable recording medium 20012 such as a semiconductor memory via the recording medium control I/F unit under the control of the system control and operation unit 20009.

Alternatively, data may be directly input via the external I/F unit 20013 to a computer or the like where the image is processed.

Many widely different embodiments of the present invention may be constructed without departing from the spirit and scope of the present invention. It should be understood that the present invention is not limited to the specific embodiments described in the specification except as defined in the appended claims.

What is claimed is:

1. An image pickup apparatus comprising:

a plurality of sensor cells each including a photoelectric conversion element, an amplifier transistor which amplifies and outputs a signal from said photoelectric conversion element, and a selector transistor for selectively outputting a signal from said amplifier transistor; and a driving circuit which supplies a predetermined voltage to said amplifier transistor so as to change said amplifier transistor to an OFF state or an accumulation state before said amplifier transistor outputs a signal generated in said photoelectric conversion element, wherein said image pickup apparatus further comprises a common output line which is commonly connected to said plurality of sensor cells and receives signals from said plurality of sensor cells, and a switching transistor for supplying the predetermined voltage to said sensor cells, wherein said driving circuit supplies the predetermined voltage to said amplifier transistor so as to change said amplifier transistor to the OFF state or the accumulation state via said switching transistor.

2. An image pickup apparatus comprising:

a plurality of sensor cells each including a photoelectric conversion element, an amplifier transistor which amplifies and outputs a signal from said photoelectric conversion element, and a selector transistor for selectively outputting a signal from said amplifier transistor; and a driving circuit which supplies a predetermined voltage to said amplifier transistor so as to change said amplifier transistor to an OFF state or an accumulation state before said amplifier transistor outputs a signal generated in said photoelectric conversion element, wherein each said sensor cell further comprises a reset transistor for supplying a reset voltage to a control electrode region of said amplifier transistor, wherein said image pickup apparatus further comprises a common output line which is commonly connected to said plurality of sensor cells and receives signals from said plurality of sensor cells, and a switching transistor for supplying the predetermined voltage to said sensor cells, and wherein said driving circuit supplies the predetermined voltage to said amplifier transistor so as to change said amplifier transistor to the OFF state or the accumulation state via said reset transistor and said switching transistor.

3. An image pickup apparatus comprising:

a plurality of sensor cells each including a photoelectric conversion element, an amplifier transistor which amplifies and outputs a signal from said photoelectric conversion element, a selector transistor for selectively outputting a signal from said amplifier transistor, and a reset transistor which supplies a predetermined voltage to a control electrode region of said amplifier transistor and includes one main electrode region connected to the control electrode region of said amplifier transistor and the other main electrode region connected to a signal line; and a driving circuit which has a mode in which a first voltage is supplied to the signal line to turn on said reset transistor before said amplifier transistor outputs a signal generated in said photoelectric conversion element, and a mode in which a second voltage different from the first voltage is supplied to the signal line to turn on said reset transistor.

4. An image pickup apparatus comprising:

a plurality of sensor cells each including a photoelectric conversion element, and an amplifier transistor which amplifies and outputs a signal from said photoelectric conversion element;

a switching transistor which supplies a predetermined voltage to a main electrode region of said amplifier transistor;

a sample/hold circuit which samples and holds a signal from said sensor cell; and a driving circuit which drives said switching transistor so as to turn on said switching transistor when said sample/hold circuit is in a hold state.

5. An image pickup apparatus comprising:

a plurality of sensor cells each including a photoelectric conversion element, and an amplifier transistor which amplifies and outputs a signal from said photoelectric conversion element;

an impedance conversion transistor which receives at a control electrode region a signal from said sensor cell and outputs the signal from a main electrode region;

a sample/hold circuit which samples and holds a signal from said impedance conversion transistor;

a switching transistor which supplies a predetermined voltage to the main electrode region of said impedance conversion transistor; and a driving circuit which drives said switching transistor so as to turn on said switching transistor when said sample/hold circuit is in a hold state.

6. An image pickup apparatus comprising:

a plurality of sensor cells each including a photoelectric conversion element, and an amplifier transistor which amplifies and outputs a signal from said photoelectric conversion element;

an impedance conversion transistor which receives at a control electrode region a signal from said sensor cell and outputs the signal from a main electrode region;

a sample/hold circuit which samples and holds a signal from said impedance conversion transistor;

a switching transistor which connects the control electrode region and main electrode region of said impedance conversion transistor; and a driving circuit which drives said switching transistor so as to turn on said switching transistor when said sample/hold circuit is in a hold state.

* * * * *

UNITED STATES PATENT AND TRADEMARK OFFICE
CERTIFICATE OF CORRECTION

PATENT NO. : 7,030,922 B2  Page 1 of 2
APPLICATION NO. : 10/194281
DATED : April 18, 2006
INVENTOR(S) : Takamasa Sakuragi It is certified that error appears in the above-identified patent and that said Letters Patent is hereby corrected as shown below:

ON COVER PAGE AT (*)NOTICE

"675 days." should read --737 days.--.

COLUMN 3

Line 23, ",ON and OFF" should read --states, ON and OFF.--; and
Line 24, "states" should be deleted.

COLUMN 6

Line 37, "case of" should read --the case--; and
Line 61, "gatesource" should read --gate-source--.

COLUMN 8

Line 33, "FIG. 10" should read --FIG. 10.--; and
Line 38, "5 sensor" should read --5. Sensor--.

COLUMN 9

Line 9, "Because, such the" should read --Such--;
Line 15, "pulse 101.1" should read --pulse 101-1--;
Line 32, "single pulses" should read --a single pulse--; and
Line 54, "tuning" should read --turning--.

UNITED STATES PATENT AND TRADEMARK OFFICE
CERTIFICATE OF CORRECTION

PATENT NO. : 7,030,922 B2
APPLICATION NO. : 10/194281
DATED : April 18, 2006
INVENTOR(S) : Takamasa Sakuragi It is certified that error appears in the above-identified patent and that said Letters Patent is hereby corrected as shown below:

<u>COLUMN 10</u>

Line 32, "as the" should read --are the--.

Signed and Sealed this

Nineteenth Day of December, 2006

JON W. DUDAS
*Director of the United States Patent and Trademark Office*